United States Patent [19]

Barnes et al.

[11] Patent Number: 5,001,184
[45] Date of Patent: Mar. 19, 1991

[54] HIGH MODULUS THERMOPLASTIC COMPOSITES

[75] Inventors: John A. Barnes, Guisborough; David McNeil, Normanby, both of United Kingdom

[73] Assignee: Imperial Chemical Industries PLC, London, England

[21] Appl. No.: 243,840

[22] Filed: Sep. 13, 1988

[30] Foreign Application Priority Data

Sep. 22, 1987 [GB] United Kingdom ............... 8722271

[51] Int. Cl.$^5$ ........................... C08K 7/06; C08K 7/04
[52] U.S. Cl. .................................... 524/495; 524/496; 524/592; 524/611
[58] Field of Search ............... 524/495, 496, 592, 611

[56] References Cited

U.S. PATENT DOCUMENTS 4,588,538  5/1986  Chung et al. .................... 264/29.2
4,842,933  6/1989  Cizmechioglu .................... 427/412

Primary Examiner—Lewis T. Jacobs
Attorney, Agent, or Firm—Cushman, Darby & Cushman

[57] ABSTRACT

Reinforced composite materials having a thermoplastic matrix and at least 30% by volume and preferably at least 35% by volume of reinforcing filaments, at least 25% by volume being pitch based graphite fibres, are produced having a longitudinal flexural modulus according to ASTM D790-81 of at least 250 GN/m$^2$. Impregnation of very fragile, inflexible pitch based graphite filaments is achieved using supporting filaments of greater robustness to the abrasion encountered in impregnation processes and, optionally, severing the filaments during the process if products containing only pitch based graphite filaments are required.

9 Claims, No Drawings

HIGH MODULUS THERMOPLASTIC COMPOSITES

This invention relates to thermoplastic composite materials reinforced with high modulus carbon or graphite filaments derived from pitch.

In the last few years satisfactory methods have been made available for the commercial production of composite materials in which continuous carbon or graphite fibres are impregnated with thermoplastic polymers to provide products in which the filaments are substantially completely wetted by the thermoplastic polymer. The importance of complete wetting of the filaments lies not only in obtaining high performance products with reliably uniform properties but in maximising the use which can be made of the exceptionally good physical properties of such filaments. Filaments derived from pitch are available which have exceptional levels of physical properties, particularly modulus, but these products are considerably more difficult to handle because of their fragility, than carbon filaments of lower modulus. These high performance filaments are in fact so fragile that the usual methods of polymer impregnation of continuous rovings of the filaments are difficult or impossible to operate in an effective production process.

It has now been found possible to produce composites which make effective use of these high performance filaments.

According to the invention there is provided a reinforced thermoplastic composite material comprising at least 30% by volume and preferably at least 35% by volume of reinforcing filaments, at least 25% by volume being pitch based graphite filaments which reinforcing filaments are substantially completely contacted by a thermoplastic matrix and wherein the composite has a longitudinal flexural modulus measured according to ASTM D790-81 of at least 210 GN/m$^2$, preferably at least 250 GN/m$^2$.

The moduli of the pitch based filaments are so much in excess of the moduli of thermoplastic polymers that providing that the filaments are wetted by polymer the prescribed modulus value for the composite can be obtained almost without regard to the nature of the thermoplastic. In practice, the thermoplastic will be chosen with the application for the product in mind. Where the application requires a high performance in respect of chemical resistance the matrix polymer used will normally be an aromatic polymer, preferably an aromatic polymer with a glass transition temperature of at least 100° C. Poly(aryl ethers), particularly polyketones are proving particularly useful as a matrix material in reinforced composites for high performance applications, such as aerospace applications, because of their high degree of environmental resistance.

The successful production of pitch-based carbon fibre composites in a continuous process is made possible by a modification of the existing processes. For example, European Patent Publication Nos. 56703 and 102159 describe processes for the continuous production of reinforced composites using melt impregnation processes. If the procedures of these patent publications are followed it is found that the fragility of the pitch based filaments prevents them being drawn, even using minimum tension, under and over a succession of curved surfaces at which impregnation takes place, without serious damage and breakage of the fibres.

According to one aspect of the present invention a process is provided for producing a reinforced thermoplastic composite containing at least 25% by volume of pitch based carbon filaments comprising providing at least one roving of pitch-based graphite filaments in combination with at least one roving of knottable filaments, separating the filaments of the rovings to provide a band of mixed filaments, introducing a supply of the thermoplastic matrix polymer to the band whilst the band is continuously pulled through an impregnation means, and impregnating the matrix polymer into the band to coat the individual filaments of the band with the thermoplastic polymer.

The term "knottable" as used in this specification is defined as the ability of a tow of the filaments to be tied into a simple overhand knot without the fibres breaking. This is a measure of the fragility of the filaments in the context of useability in an impregnation process in which the rovings are required to be pulled over a number of surfaces with successive changes of direction. Pitch based graphite filaments are not knottable because the tying of a simple overhand knot in a roving results in snapping of the bundle of filaments.

The supply of thermoplastic polymer may be in the form of a solution, fine particles or a melt, and is preferably a molten mixture of the polymer in a plasticiser for the melt applied at a temperature above the glass transition temperature of the melt, the plasticiser being capable of being volatilised from the composite at a temperature below the decomposition temperature of the polymer.

In the case of a solution impregnation process impregnation is relatively easy at low concentrations of the polymer in solution but provision must be made for recovery of large volumes of solvent. More importantly, it is difficult to remove all the solvent from the finished composite.

In the case of a fine particle impregnation process the fine particle may be a powder or particles suspended as an emulsion or dispersion. If a dry powder is used the powder is eventually melted to coat the filaments but it is difficult to avoid damage of the filaments by the abrasion effect of the polymer whilst it is in the powder form.

The use of a volatile plasticiser/polymer melt process is particularly useful because experience shows there is little difficulty in removing the plasticiser from the molten polymer and because in the initial stages of the impregnation the filaments can be wetted and protected with a melt containing a high proportion of melt plasticiser. After protection in this manner, the roving can be contacted with a supply of plasticised melt containing a sufficiently high concentration of polymer to provide a void free matrix when volatilisation is complete.

After the supply of polymer has been introduced to the band of filaments it is usually necessary to provide an impregnation means for ensuring that the polymer intimately contacts substantially all the filament surfaces. This normally comprises surfaces such as rods or bars, preferably heated, over which the band containing-polymer is drawn to assist the flow of molten polymer around the filaments.

The proportion of filaments other than the pitch based filaments (the knottable filaments) will depend on the requirements of the final product. Generally, it is required to maximise the proportion of pitch based filaments so that it is only necessary to use sufficient non-pitch based filament to provide the necessary robustness to the mixed filament band to enable the band to traverse the impregnation system without significant damage to the pitch based filaments. The risk of damage is greatest in the start-up of the process when the loads on the fibres are most severe. It has been found possible to provide a product in which the only reinforcing filaments present are pitch-based filaments by initiating the process with a mixed filament system and severing the non-pitch based filaments after the continuous process is running smoothly so that subsequent product is reinforced only with pitch based filaments. Where the non-pitch based fibres are to be removed from the system after start-up they may initially be present at high concentration relative to the pitch based fibres.

For some applications the presence of some non-pitch based carbon filaments is not a disadvantage because composites containing such filaments can still have relatively good properties. The presence of such additional fibres may indeed provide advantages in subsequent fabrication processes. Where the application requires the presence of the maximum volume content of filaments it may be essential to provide product containing hybrid filaments.

The high longitudinal flexural moduli products of the invention, having a flexural modulus of at least 210 $GN/m^2$ and preferably at least 250 $GN/m^2$ are obtained by having a sufficiently high volume fraction of well wetted filaments. As indicated the filaments may be mixtures of different types of reinforcing filaments with the proviso that the composite contains at least 25% by volume of pitch based graphite fibres. In order to achieve the flexural modulus values specified it will be necessary to include other reinforcing filaments if only the minimum level of 25% by volume of pitch based graphite fibres are present. Values of longitudinal flexural modulus considerably in excess of the quoted values can be obtained from pitch based fibres alone when composites containing 50% by volume or more of well wetted pitch based filaments are produced.

The invention is further described by reference to the following examples.

EXAMPLE 1

26 rovings of Thornel P100 pitch based carbon fibres (obtainable from Amoco Performance Products Ltd), each roving containing 2000 filaments, and 6 rovings of Hercules AS4 carbon fibres (obtainable from Hercules Corporation) each roving containing 12000 filaments were fed from separate creels to form a band of mixed fibres approximately 55 mm wide. The band was pulled through a melt impregnation system consisting of a guide bar, a pair of heated, contrarotating nip rolls, rotating at a circumferential velocity of 80% of the draw-through velocity of band, and three in-line, heated, fixed bars. In operation, a powdered blend of diphenyl sulphone and a polyetheretherketone (sold by Imperial Chemical Industries PLC under the trade mark 'Victrex' PEEK) was fed to the nip between, the heated rolls, the rolls being maintained at a temperature (ca 425° C.) sufficient to melt the powdered blend and maintain the melt at a temperature of 400° C. The blend was in the weight ratio of 9 parts melt plasticiser to 1 part polymer. The PEEK polymer had a melt viscosity of 110 $N/m^2$, measured at 380° and zero shear. The band was pulled at a speed of 0.5 m/min over the guide bar, through the melt and between the two rotating rolls and subsequently over the upper surfaces of the in-line fixed bars, which were heated to 425° C. The band was then passed through a hot air tunnel to volatilise the residual diphenyl sulphone.

After start up the speed was increased to 1.6 m/min and the PEEK concentration in the bath was increased to 3 parts plasticiser to 1 part PEEK. After 15 minutes of smooth running the AS4 rovings were severed to provide a product reinforced solely by the Thornel P100 fibres.

The procedure was repeated to provide a composite of P100 with a high temperature performance polyethersulphone matrix of an amorphous polyether sulphone having a glass transition temperature of 260° C. sold by ICI under the trade name 'Victrex' HTA.

The reinforced prepregs produced were consolidated into test pieces by pressing strips of the prepreg in a matched die mould at 400° C. to provide samples 50 mm wide, 150 mm long and 1 mm thick.

The table below shows the properties measured on these test pieces. In addition, a further experiment was performed using only 2 rovings of P100 fibre to produce a thin tape suitable for filament winding. The prepreg tape produced was about 7.5 mm wide and was consolidated into a test piece 7.5 mm wide, 150 mm long and 1 mm thick.

|  |  | Fibre Areal Weight | Fibre Content | Longitudinal Flexural Modulus $GN/m^2$ |
| --- | --- | --- | --- | --- |
| P100/PEEK | 50 mm width | 145 $gm/m^2$ | 55% by vol. | >300 |
| P100/PEEK | 7.5 mm width | 80 $gm/m^2$ | 70% by vol. | >300 |
| P100/HTA | 50 mm width | 145 $gm/m^2$ | 55% by vol. | >300 |

The results indicate a high degree of wetting of the individual filament by the polymer matrices.

EXAMPLE 2

The procedure of Example 1 was followed using two 2400 tex E-glass rovings as support for 60 rovings of Thornel P75 pitch based carbon fibres each containing 2000 filaments. The PEEK polymer of Example 1 was used as the matrix. After smooth running was achieved as indicated in Example 1 the glass rovings were severed and products consisting wholly of Thornel P75 as the filament reinforcement were obtained. At a volume fraction of about 55% by volume of filaments a flexural modulus of 236 $GN/m^2$ was obtained.

We claim:

1. A reinforced thermoplastic composite material comprising at least 30% by volume of continuous, collimated reinforcing filaments, at least 25% by volume being pitch-based graphite filaments, which reinforcing filaments are substantially completely contacted by a thermoplastic matrix and wherein the composite has a longitudinal flexural modulus measured according to ASTM D790-81 of at least 210 $GN/m^2$.

2. A reinforced thermoplastic composite material according to claim 1 having a longitudinal flexural modulus according to ASTM D790-81 of at least 250 $GN/m^2$.

3. A reinforced thermoplastic composite according to either of claims 1 and 2 wherein the thermoplastic matrix comprises a poly(aryl ether).

4. A reinforced thermoplastic composite material according to claim 1 wherein the thermoplastic matrix has a glass transitional temperature of at least 100° C.

5. A reinforced thermoplastic composite material according claim 1 comprising at least 50% by volume of pitch-based graphite reinforcing filaments.

6. A reinforced thermoplastic composite material comprising at least 30% by volume of continuous, collimated reinforcing filaments, at least 25% by volume being pitch-based graphite filaments, which reinforcing filaments are substantially completed by a thermoplastic matrix which is selected from poly(aryl ether sulphones) and poly(aryl ether ketones) and wherein the composite has a longitudinal flexural modulus measured according to ASTM D790-81 of at least 210 $GN/m^2$.

7. A reinforced thermoplastic composite material comprising at least 30% by volume of continuous, collimated reinforcing filaments, at least 25% by volume being pitch-based graphite filaments, which reinforcing filaments are substantially completely contacted by a thermoplastic poly(aryl ether ketone) matrix and wherein the composite has a longitudinal flexural modulus measured according to ASTM D790-81 of at least 210 $GN/m^2$.

8. A reinforced thermoplastic composite material comprising at least 50% by volume of continuous, collimated pitch-based graphite filaments, which reinforcing filaments are substantially completely contacted by a thermoplastic poly(aryl ether ketone) matrix and wherein the composite has a longitudinal flexural modulus measured according to ASTM D790-81 of at least 210 $GN/m^2$.

9. A reinforced thermoplastic composite material comprising at least 30% by volume of continuous, collimated reinforcing filaments, at least 25% by volume being pitch-based graphite filaments, which reinforcing filaments are substantially completely contacted by a thermoplastic matrix applied thereto by a melt impregnation process and wherein the composite has a longitudinal flexural modulus measured according to ASTM D790-81 of at least 210 $GN/m^2$.

* * * * *